United States Patent
Kleiber et al.

(10) Patent No.: US 10,266,071 B2
(45) Date of Patent: Apr. 23, 2019

(54) CONTROL ELEMENTS IN AN ARMREST DEVICE

(71) Applicant: GRAMMER AG, Amberg (DE)

(72) Inventors: Daniel Kleiber, Amberg (DE); Thomas Haller, Ursensollen (DE); Florian Schanderl, Schwarzenfeld (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 15/472,487

(22) Filed: Mar. 29, 2017

(65) Prior Publication Data

US 2017/0282762 A1 Oct. 5, 2017

(30) Foreign Application Priority Data

Apr. 1, 2016 (DE) .......... 10 2016 106 030
Apr. 1, 2016 (DE) .......... 20 2016 101 747 U (51) Int. Cl.
| | | |
|---|---|---|
| *B60N 2/02* | (2006.01) | |
| *B60N 2/75* | (2018.01) | |
| *B60N 2/66* | (2006.01) | |
| *B60N 2/56* | (2006.01) | |
| *B60N 2/64* | (2006.01) | |
| *B60N 2/90* | (2018.01) | |

(52) U.S. Cl.
CPC .......... *B60N 2/0228* (2013.01); *B60N 2/797* (2018.02); *B60N 2/56* (2013.01); *B60N 2/643* (2013.01); *B60N 2/665* (2015.04); *B60N 2/976* (2018.02)

(58) Field of Classification Search
CPC ........ B60N 2/0228; B60N 2/56; B60N 2/643; B60N 2/665; B60N 2/797; B60N 2/976
See application file for complete search history.

(56) References Cited

U.S. PATENT DOCUMENTS 5,244,066 A * 9/1993 Mackoway .......... E02F 9/2004
    192/13 R
5,555,172 A * 9/1996 Potter .................. B60N 2/0244
    340/990

(Continued)

FOREIGN PATENT DOCUMENTS

DE       100 37 619 A1   8/2000
DE  10 2007 029 598 A1   2/2008

(Continued)

OTHER PUBLICATIONS

Search Report prepared by the German Patent Office dated Dec. 16, 2016, for German Patent Application No. 102016106030.5.

(Continued)

*Primary Examiner* — James M Ference
(74) *Attorney, Agent, or Firm* — Sheridan Ross PC (57) ABSTRACT

Armrest device for utility vehicle seats, wherein the armrest device has a plurality of first control elements and at least one second control element, wherein by means of selecting and actuating one of the first control elements which is arranged on an upper surface of the armrest device, seen in a height direction, a vehicle function can be assigned to the selected first control element and by means of actuating the second control element, which is arranged on a side surface of the armrest device and is connected at least by means of a signal to the selected first control element, the vehicle function is adjustable.

10 Claims, 5 Drawing Sheets

(56) References Cited

U.S. PATENT DOCUMENTS

| | | | | |
|---|---|---|---|---|
| 5,566,778 | A * | 10/1996 | Valier | B60K 20/02 180/334 |
| 5,887,669 | A * | 3/1999 | Ostler | B60K 25/00 180/333 |
| 5,945,646 | A * | 8/1999 | Miller | B60K 35/00 200/1 R |
| 5,960,903 | A * | 10/1999 | Abels | B60R 22/26 180/315 |
| 6,476,794 | B1 * | 11/2002 | Kataoka | B60H 1/00985 200/5 A |
| 7,018,158 | B2 * | 3/2006 | Amamiya | G05G 1/58 414/636 |
| 7,302,322 | B1 * | 11/2007 | Szczerba | B60R 16/0231 701/29.6 |
| 7,373,229 | B2 * | 5/2008 | Szczerba | B60H 1/00985 345/184 |
| 7,965,282 | B2 * | 6/2011 | Yamada | B60K 37/06 200/5 R |
| 7,999,790 | B2 * | 8/2011 | Scott | B64D 43/00 345/161 |
| 8,039,769 | B2 * | 10/2011 | Asp | B66F 17/00 180/272 |
| 8,378,969 | B2 * | 2/2013 | Takenaka | G06F 3/016 345/156 |
| 9,007,199 | B2 * | 4/2015 | Yamada | G07C 5/00 340/438 |
| 9,069,396 | B2 * | 6/2015 | Adler | G06F 3/038 |
| 2002/0125988 | A1 * | 9/2002 | Nagasaka | B60J 7/0573 340/3.7 |
| 2002/0171292 | A1 * | 11/2002 | Dinkel | B60N 2/797 307/10.1 |
| 2003/0234764 | A1 * | 12/2003 | Noguchi | B60R 11/02 345/156 |
| 2004/0031667 | A1 * | 2/2004 | Dinkel | B60Q 1/1476 200/5 A |
| 2004/0164963 | A1 * | 8/2004 | Ono | G06F 3/016 345/167 |
| 2005/0133292 | A1 * | 6/2005 | Ginzel | B60K 20/02 180/315 |
| 2007/0273207 | A1 * | 11/2007 | Dorn | B60K 37/06 307/10.1 |
| 2008/0278442 | A1 * | 11/2008 | Kishi | G01C 21/3664 345/156 |
| 2009/0140993 | A1 * | 6/2009 | Han | B60W 50/16 345/173 |
| 2010/0199212 | A1 * | 8/2010 | Heers | B60K 35/00 715/784 |
| 2011/0025488 | A1 * | 2/2011 | Leon | B60K 35/00 340/456 |
| 2012/0193930 | A1 * | 8/2012 | Wihinen | B60K 35/00 296/24.34 |
| 2014/0297105 | A1 * | 10/2014 | Graumann | B60K 37/06 701/36 |
| 2015/0251573 | A1 * | 9/2015 | Misch | B60N 2/665 297/452.41 |
| 2015/0375865 | A1 * | 12/2015 | Fischer | B60N 2/919 701/49 |
| 2017/0015422 | A1 * | 1/2017 | Garing | B64D 11/0639 |
| 2017/0217343 | A1 * | 8/2017 | Klieber | B60N 2/443 |
| 2017/0282762 | A1 * | 10/2017 | Klieber | B60N 2/4693 |
| 2017/0325287 | A1 * | 11/2017 | Ji | H05B 1/0236 |

FOREIGN PATENT DOCUMENTS

| | | |
|---|---|---|
| EP | 1343113 | 9/2003 |
| FR | 2889125 | 2/2007 |

OTHER PUBLICATIONS

Extended Search Report for European Patent Application No. 17162252.5, dated Aug. 2, 2017, 3 pages.

* cited by examiner

CONTROL ELEMENTS IN AN ARMREST DEVICE

CROSS-REFERENCE TO RELATED APPLICATIONS

This application claims the benefit of German Patent Application No. DE 10 2016 106 030.5 filed Apr. 1, 2016, and German Patent Application No. DE 20 2016 101 747.5 filed Apr. 1, 2016, the entire contents of which are incorporated herein by reference.

FIELD

The invention relates to an armrest device for utility vehicle seats, wherein the armrest device has a plurality of first control elements and at least one second control element.

BACKGROUND

The state of the art discloses, for example, armrests which have a separate control element for each possible adjustment within the passenger compartment, in particular for the vehicle seat. The state of the art thus discloses, for example, that for adjusting the wing mirrors, for the seat heating, for the lumbar support and other possible adjustments each of these possible adjustments has a separate control element, which control elements are arranged around the passenger in the passenger compartment in reach of the passenger.

This arrangement thus provides a multiplicity of control elements which can or must be actuated by a passenger, wherein the arrangement of numerous control elements within the passenger compartment can be confusing for a passenger and the particular possible adjustment currently desired cannot be found immediately and thus can also distract the vehicle driver.

SUMMARY

It is accordingly the object of the present invention to reduce the number of control elements and to provide good accessibility without the passenger or the vehicle driver being distracted.

This object is achieved according to the features of claim 1. Advantageous embodiments of the invention are to be found in the dependent claims.

The central idea of the invention is to provide an armrest device for utility vehicle seats, wherein the armrest device has a plurality of first control elements and at least one second control element, wherein by means of selecting and actuating one of the first control elements, which is arranged on an upper surface of the armrest device, seen in a height direction, a vehicle function can be assigned to the selected first control element, and by means of actuating the second control element, which is arranged on a side surface of the armrest device and is connected at least by means of a signal to the selected first control element, the vehicle function is adjustable.

In particular, by actuating the second control element the sensitivity of the vehicle function can be adjusted, wherein the term "sensitivity" is understood as meaning the ratio of the change in the vehicle function to the change causing it, analogously to the term "sensitivity" such as is known from the field of sensor technology.

A change in the vehicle function is initiated by actuating a second control element, wherein the duration and/or the frequency of the actuation of the second control element changes the vehicle function accordingly. It is thus conceivable that during a continuous actuation, that is to say, for example, an uninterrupted pressing of the second control element, this is detected and the vehicle function can be adjusted according to a predetermined or predeterminable sensitivity. In the case of interrupted pressing of the second control element, that is to say, for example, a repeated pressing of the second control element, it is conceivable that the vehicle function can be changed by a certain value on each pressing of the second control element. A combination of interrupted and uninterrupted pressing is of course also conceivable.

According to the present invention, the most important or most frequently used vehicle functions can be arranged on the armrest and can in each case be adjusted by means of the at least one second control element. By the particular arrangement of the control elements, of the first control elements on an upper surface of the armrest device and of the second control elements on a side surface of the armrest device, the vehicle functions can be operated using one hand or very reliably without great effort, for example, depending on the arrangement of the second control element.

An arrangement of the first control elements on an upper surface or alternatively or cumulatively on a lower surface of the armrest device and an arrangement of the second control elements on a side surface of the armrest device has the advantage in particular that an unintentional actuation of control elements, for example by a vehicle driver's elbow, can be prevented, since actuation of control elements in two different planes prevents such unintentional actuation, in particular when the working positions of the vehicle driver are directed backwards or to the side, when the control elements do not lie in the drivers field of vision. Regardless of the arrangement of the first and/or second control elements, operating comfort is not restricted According to a particularly preferred embodiment, the first and second control elements can be operated even more easily if the at least one second control element is arranged on the side surface of the armrest device which faces the utility vehicle seat. Referred to in each case in the longitudinal direction of the vehicle seat, for an armrest device arranged on the right the at least one second control element is located on the left-hand side surface and for an armrest device arranged on the left the at least one second control element is located on the right-hand side surface.

By means of such an arrangement of the second control element the second control element can be actuated in a particularly simple manner using the thumb, wherein the first control elements can be easily actuated using the remaining fingers. The positions of the control elements are recreated according to the fundamental formation of a hand.

Alternatively or cumulatively, according to a further preferred embodiment, it is conceivable that at least one second control element is arranged on the side surface of the armrest device which faces away from the vehicle seat. Actuation of the second control elements according to this embodiment can furthermore be performed in a simple manner, but since the second control elements are arranged on the side surface facing away from the vehicle seat an unintentional actuation on the part of the vehicle driver can be reduced further.

According to a further embodiment, it is conceivable that the positions of the first and/or second control elements are changeable with respect to the armrest device. The control elements can thus be arranged according to the size and shape of the hand of a passenger or vehicle driver. It is conceivable that the control elements are arranged displaceably on a track device. The control elements can thus, for example, be displaced in their position. A further advantage is that the arm support comfort can be increased further. For example, if the first control elements are shifted away from a front region of the armrest, a significantly higher comfort is achieved for supporting an elbow on the front region of the armrest, in particular during steering movements.

Alternatively or cumulatively, the support comfort can be increased further, in particular in the case of fixed-position first and/or second control elements, if the control elements can be concealed by a displaceable cover. If the control elements are concealed by the cover, the cover can likewise be used for supporting the arm without it being possible to actuate the control elements. The cover is preferably integrated in the armrest device and can be displaced automatically and/or manually such that covering of the control elements can be achieved.

According to a particularly preferred embodiment, the vehicle functions can be adjusted if at least two second control elements are provided. Particularly advantageously, the two second control elements can be differentiated at least haptically from one another, for example by a different size of the control elements and/or a concave and convex configuration of the control elements. Due to the haptic differentiation it is possible for the operator to perform the particular desired function without the operator having to check visually whether the function performed also corresponds to the desired function.

According to a particularly preferred embodiment, the at least two second control elements (3) are arranged on a side surface (5) facing the utility vehicle seat and/or on a side surface (5) facing away from the utility vehicle seat.

It is further advantageous to provide two second control elements and to allocate the one second control element an increment function and the other second control element a decrement function. On actuating the second control element with the increment function the value of the vehicle function is increased, for example a lumbar support balloon is filled. When the second control element with the decrement function is actuated, the value of the vehicle function is lowered and the lumbar support balloon is emptied.

It is further advantageous if at least the first control elements each have backlighting. Particularly advantageously, the backlighting of the first control element can be activated when the first control element is actuated.

By this means the operator can check by a brief visual contact which vehicle function is selected at that moment.

The operation by means of a hand can further be configured still more comprehensively according to a further embodiment if at least one third control element is arranged on a front surface of the armrest device, seen in the longitudinal direction of the utility vehicle seat. It is advantageous for a vehicle function to be permanently assigned to the third control element, for example the height adjustment of the utility vehicle seat or the adjustment of the damping and/or springing of the utility vehicle seat. The third control elements can be conveniently operated in this context using the index finger or the middle finger.

According to a further preferred embodiment, the selection of one of the first control elements can be cancelled automatically after a predeterminable or predetermined period of time. If according to the present invention a first control element has been selected and actuated, the assigned vehicle function is likewise selected. When the value of the vehicle function has been adjusted and a further adjustment is no longer required, it is advantageous if the selection is cancelled automatically after a certain period of time. By this means the risk of an unintentional adjustment of the vehicle function can also be minimised. Advantageously, the selection cancels after a period of several minutes, more advantageously after one minute and yet more advantageously after 30 seconds and particularly advantageously after 10 seconds.

If backlighting is to be provided, the backlighting also extinguishes after the particular period of time, as a result of which it can be indicated visually to the vehicle driver once again that no vehicle function is selected at that moment.

According to a particularly preferred embodiment, a detection device is provided, by means of which the actuation of one of the first control elements is detectable. Advantageously, the detection device generates a signal which can be assigned to the actuated first control element.

By means of the detection device it is therefore possible to detect which first control element has been actuated.

According to a further embodiment, the signal generated by means of the detection device can be transmitted to an assignment device and a vehicle function can be assigned to the actuated first control element by means of the assignment device.

According to the actuation of the first control element, a vehicle function is assigned to this control element by means of the assignment device. It is also conceivable here to assign a different vehicle function to a certain first control element by a change in the assignment device.

The plurality of first control elements can thus be adapted depending on the requirements and wishes of the passenger or the available functions of the utility vehicle.

According to a preferred embodiment, a control device is provided, by means of which depending on the actuated first control element with the assigned vehicle function the vehicle function can be adjusted on actuation of the at least one second control element according to a predeterminable or predetermined sensitivity of the vehicle function.

According to a further embodiment, the control device is connected at least by means of a signal to the assignment device, the at least one second control element and the particular actuators for adjusting the vehicle function.

Further advantageous embodiments emerge from the dependent claims.

BRIEF DESCRIPTION OF THE DRAWINGS

Further aims, advantages and purposes of the present invention are to be found in the following description in combination with the drawings, in which.

DETAILED DESCRIPTION

Figure 1:
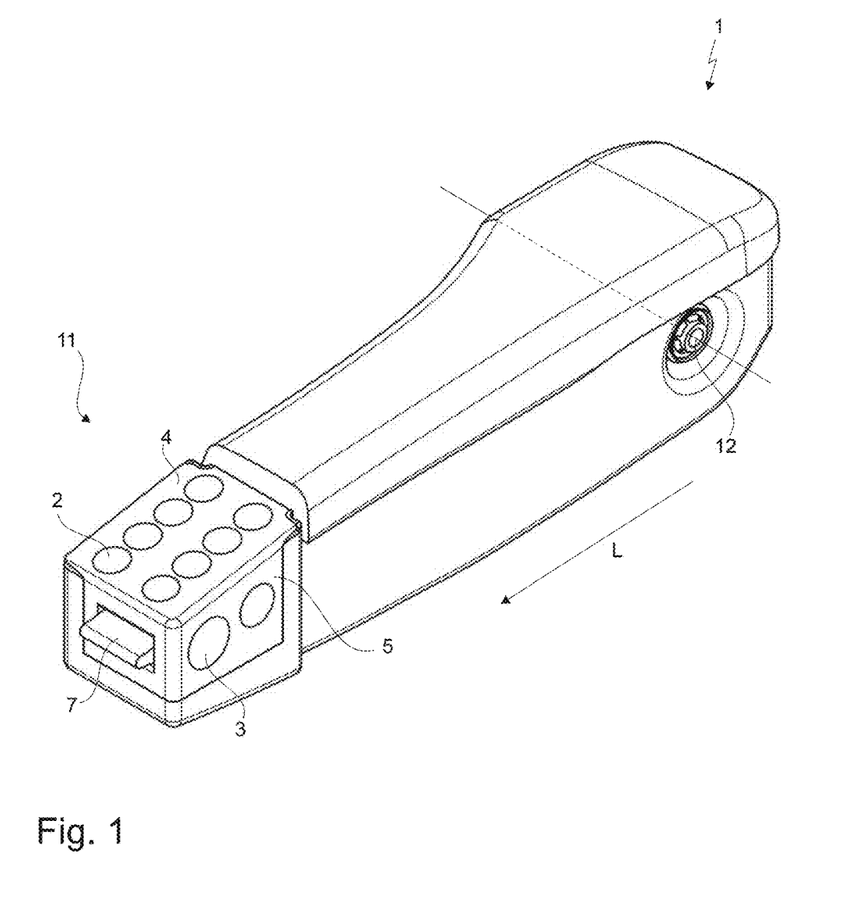
FIG. 1 is a perspective view of an armrest device.

The armrest device 1 shown in FIG. 1 comprises a multiplicity of first control elements 2 which are arranged on an upper surface 4 of the armrest device 1 and in particular in terms of the longitudinal direction in a front region 11 of the armrest device 1, and two second control elements 3 which are arranged on a side surface 5 and likewise in the front region 11 of the armrest device 1. The armrest device 1 is configured such that it can be swivelled around a swivelling axis 12, wherein by means of the swivelling axis 12 the armrest device 1 can be arranged, for example, on the utility vehicle seat (not shown here). The armrest device 1 further comprises a third control element 7 which is arranged on a front surface 6 of the armrest device 1 seen in the longitudinal direction.

By means of the arrangement shown in FIG. 1, the first 2, second 3 and likewise the third control elements 7 can be easily actuated using one hand. Preferably, the present armrest device 1 is a right-hand armrest. However, it is also conceivable for the armrest device 1 shown to be a left-hand armrest. The second control elements 3 can be arranged on a side surface 5 facing the vehicle seat and/or on a side surface 5 facing away from the vehicle seat.

Figure 2A:
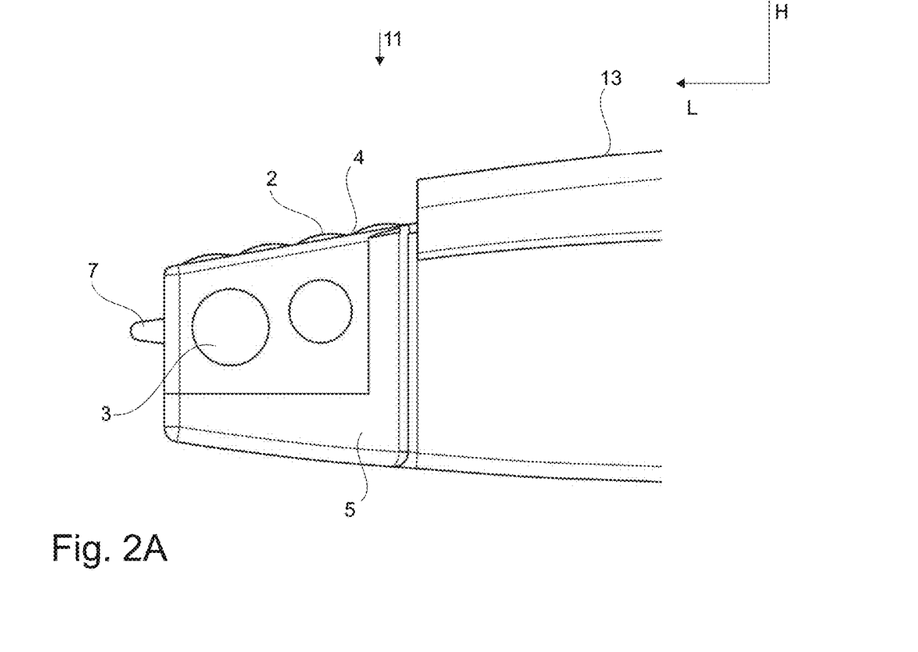
FIG. 2A is a side view of an armrest device according to FIG. 1.

FIG. 2A is a side view of the armrest device 1 of FIG. 1 It can also be clearly seen here that in the present case the upper surface 4 is lowered further with respect to an arm support 13 seen in the height direction H. This assists and facilitates likewise the operation of the control elements 2, 3, 7, since the configuration of the armrest device 1 is adapted still more closely to the shape of a hand. As can be seen further, in the present case the first control elements 2 are concave in construction, so that feeling by an operator can be effected more easily.

Figure 2B:
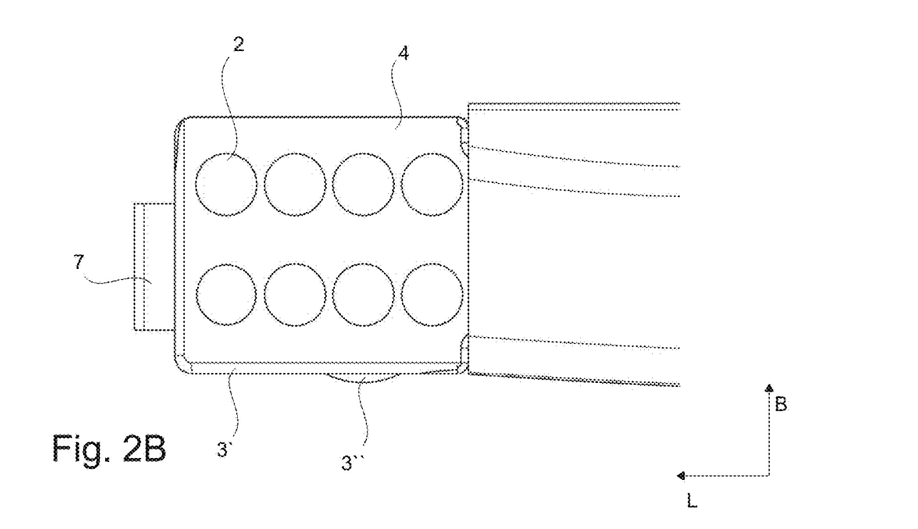
FIG. 2B is a plan view of an armrest device according to FIG. 1.

It is further to be seen that the second control elements 3 attached on the side can be differentiated haptically. FIG. 2A thus shows inter alia a different size of the second control elements 3, while FIG. 2B, which is a plan view of the armrest device 1 of FIG. 1, shows inter alia that one of the second control elements 3' is concave in construction and the other second control element 3" is convex in construction, as a result of which an easy, haptic differentiation can be provided for the operator. It is therefore not necessary for the operator to have to perform a visual control in order to check which function he is just actuating.

Figure 3A:
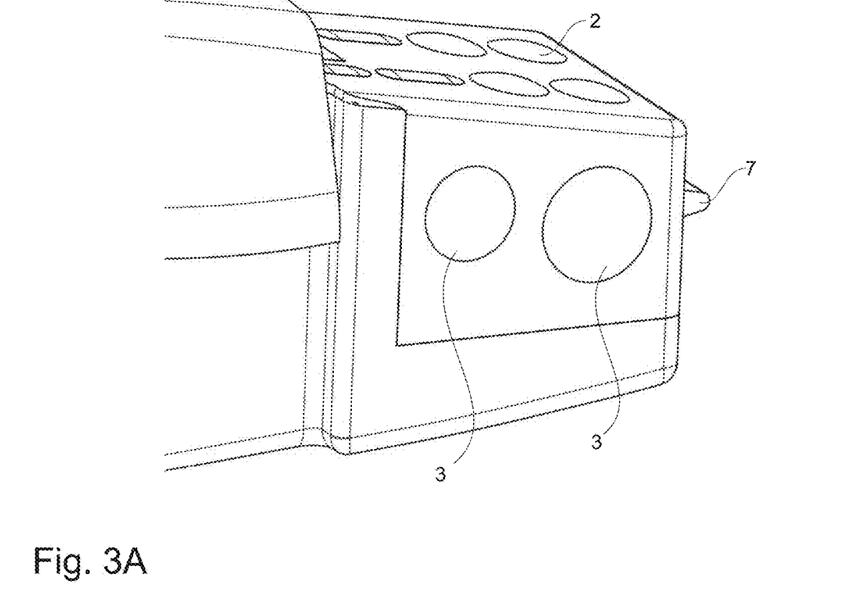
FIG. 3A is a view of second control elements.
Figure 3B:
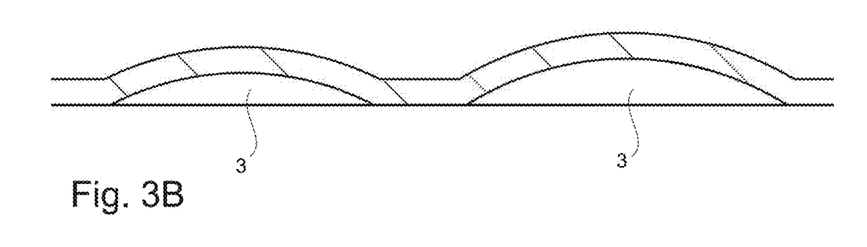
FIG. 3B is a section in the width direction of FIG. 3A.

Another embodiment variant of the second control elements 3 is shown in FIGS. 3A and 3B, wherein FIG. 3A is a perspective view and FIG. 3B is a section in the width direction B through both second control elements 3.

As can be seen from the drawings, in the present case both second control elements 3 are concave in construction, so that the risk of an accidental use can be reduced as far as possible. For the haptic differentiation in the present case it is entirely sufficient to have different sizes and optionally different raised symbols, such as a "+" and a "−" shown in the present case.

Figure 4:
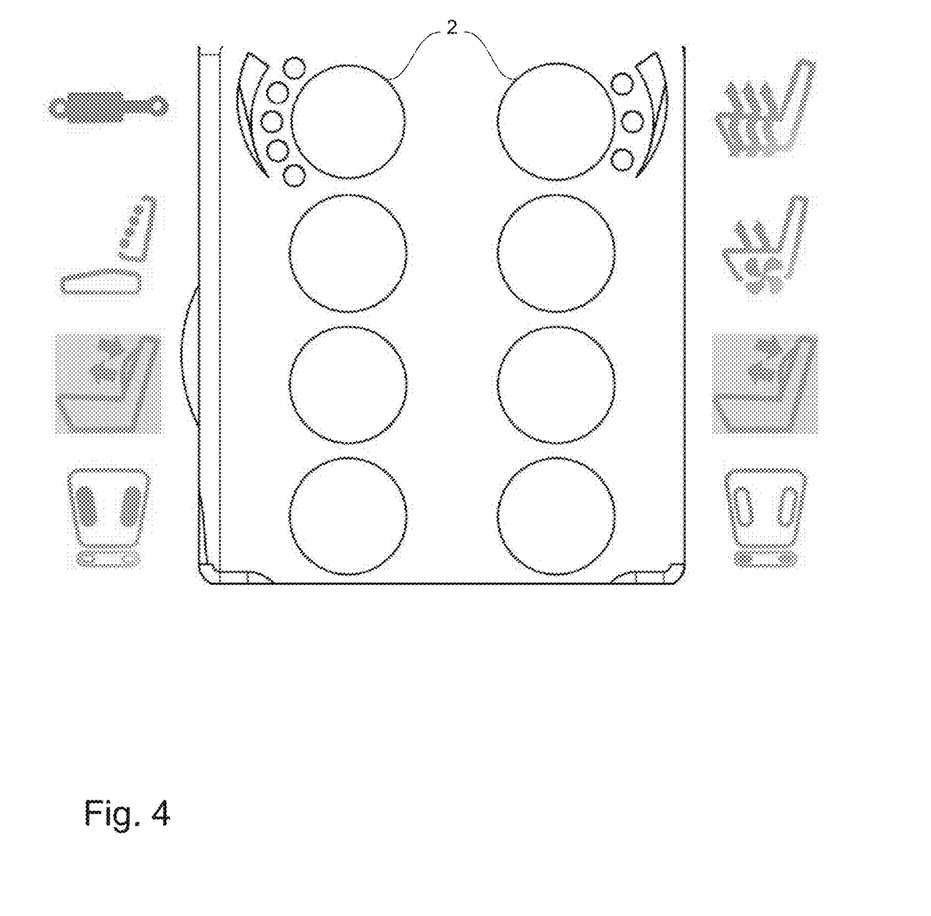
FIG. 4 shows possible arrangements of first control elements.

FIG. 4 shows a possible arrangement of first control elements 2 which comprises the following functions, starting from the left top to left bottom and right top to right bottom: driving mode switch, massage system, lumbar support upper balloon, side contour back cushion, seat heating, active seat climate control, lumbar support lower balloon, side contour seat cushion.

Figure 5:
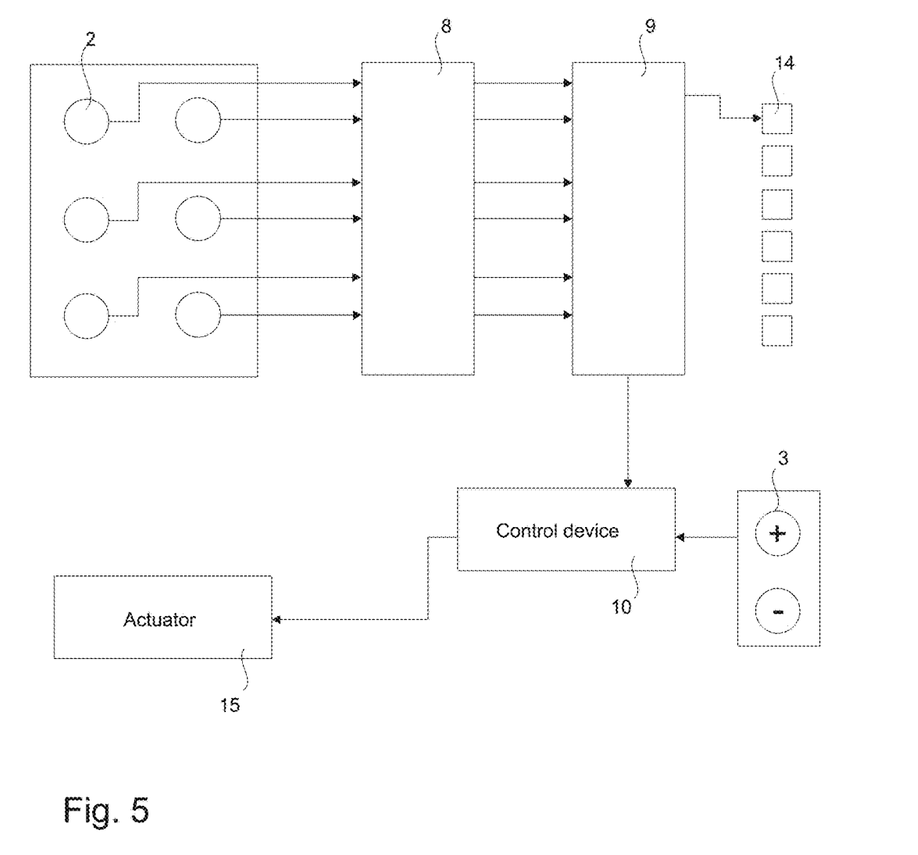
FIG. 5 shows an electronic circuit.

FIG. 5 shows in this context a possible electronic arrangement for controlling the vehicle functions 14 according to the invention. When an operator actuates a first control element 2, the detection device 8 detects this actuation and generates a signal which is assigned to the actuated first control element 2. This signal is transmitted to an assignment device 9, wherein a vehicle function 14 can be assigned to the actuated first control element 2 by means of the assignment device 9. By changing the underlying assignment specification, a different vehicle function 14 can also be assigned to each first control element.

A control device 10 is further provided, which is connected at least by means of a signal to the assignment device 9, the second control elements 3 and the associated actuators 15.

Preferably, the particular vehicle function 14 also comprises information on the manner in which an actuator 15 is controlled by means of the control device. This is appropriate since a lumbar support should of course be adjusted with a different adjustment speed to a massage system or a cushion contour, for example of the backrest or of the seat part.

Advantageously, the second control element 2 can be actuated continuously and/or actuated several times. A change in the vehicle function is initiated by actuating a second control element, wherein the duration and/or the frequency of the actuation of the second control element changes the vehicle function accordingly. It is thus conceivable that during a continuous actuation, that is to say, for example, an uninterrupted pressing of the second control element, this is detected and the vehicle function can be adjusted according to a predetermined or predeterminable sensitivity. In the case of interrupted pressing of the second control element, that is to say, for example, a repeated pressing of the second control element, it is conceivable that the vehicle function can be changed by a certain value on each pressing of the second control element. A combination of interrupted and uninterrupted pressing is of course also conceivable.

All the features disclosed in the application text are claimed as essential to the invention where they are novel with respect to the state of the art individually or in combination.

LIST OF REFERENCE SIGNS

1 Armrest device
2 First control element
3 Second control element
4 Upper surface
5 Side surface
6 Front surface
7 Third control element
8 Detection device
9 Assignment device
10 Control device
11 Front region
12 Swiveling axis
13 Arm support surface
14 Vehicle function
15 Actuator
B Width direction
L Longitudinal direction
H Height direction

The invention claimed is:

1. An armrest device for a utility vehicle seat, wherein the armrest device comprises:
   a plurality of first control elements arranged on an upper surface of the armrest device, wherein a first control element of the plurality of first control elements is configured to be actuated to assign a vehicle function to the first control element and to form an actuated first control element, and
   at least one second control element arranged on a side surface of the armrest device, wherein a second control element of the at least one second control element is operably connected to the actuated first control element via a plurality of signals, and the second control element of the at least one second control element is configured to be actuated to adjust the vehicle function;

a detection device that detects actuation of the first control element of the plurality of first control elements and that generates a signal of the plurality of signals which can be assigned to the actuated first control element, wherein the detection device is configured to transmit the signal generated to an assignment device, which is configured to assign a vehicle function to the actuated first control element; and a control device, wherein, depending on the actuated first control element with the assigned vehicle function, the control device is configured to adjust the vehicle function on actuation of the second control element of the at least one second control element according to a predeterminable or predetermined plan, wherein the control device is connected via additional signals of the plurality of signals to the assignment device, the at least one second control element, and actuators for adjusting the vehicle function.

2. The armrest device according to claim 1, wherein the at least one second control element is arranged on a side surface of the armrest device which faces the utility vehicle seat.

3. The armrest device according to claim 1, wherein the at least one second control element is arranged on a side surface of the armrest device which faces away from the utility vehicle seat.

4. The armrest device according to claim 1, wherein the at least one second control element comprises two second control elements that are differentiated at least haptically from one another.

5. The armrest device according to claim 4, wherein the two second control elements are arranged on a side surface facing the utility vehicle seat and/or on a side surface facing away from the utility vehicle seat.

6. The armrest device according to claim 4, wherein haptically differentiated is at least one of a size difference and a concavity difference.

7. The armrest device according to claim 1, wherein first control elements of the plurality of first control elements each have backlighting that can be activated when each first control element of the plurality of first control elements is actuated.

8. The armrest device according to claim 1, wherein at least one third control element is arranged on a front surface of the armrest device.

9. The armrest device according to claim 1, wherein actuation of the first control element of the plurality of first control elements can be cancelled automatically after a predeterminable or predetermined period of time.

10. The armrest device according to claim 1, wherein the vehicle function is at least one of a driving mode, a massage system, a lumbar support upper balloon, a side contour back cushion, a seat heater, an active seat climate control, a lumbar support lower balloon, and a side contour seat cushion.

* * * * *